United States Patent
Tauzia

(10) Patent No.: US 6,867,816 B2
(45) Date of Patent: Mar. 15, 2005

(54) METHOD AND DEVICE TO DISPLAY AN INDEX OF TELETEXT PAGES

(75) Inventor: Vincent Tauzia, Aix-en-Provence (FR)

(73) Assignee: STMicroelectronics SA, Montrouge (FR)

( * ) Notice: Subject to any disclaimer, the term of this patent is extended or adjusted under 35 U.S.C. 154(b) by 470 days.

(21) Appl. No.: 09/852,962

(22) Filed: May 10, 2001

(65) Prior Publication Data

US 2002/0012067 A1 Jan. 31, 2002

(30) Foreign Application Priority Data

May 12, 2000 (FR) .............................................. 00 06035

(51) Int. Cl.$^7$ ................................................. H04N 7/00
(52) U.S. Cl. ........................ 348/468; 348/461; 348/465
(58) Field of Search ................................ 348/461, 465, 348/468, 689, 703; 725/137; 345/689, 703; H04N 7/00

(56) References Cited

U.S. PATENT DOCUMENTS

| | | | | |
|---|---|---|---|---|
| 4,337,485 A | * | 6/1982 | Chambers | 348/467 |
| 4,908,707 A | * | 3/1990 | Kinghorn | 348/460 |
| 4,991,017 A | * | 2/1991 | Raaijmakers | 348/468 |
| 4,991,018 A | * | 2/1991 | Davies | 348/468 |
| 5,208,671 A | * | 5/1993 | Tarrant | 348/465 |
| 5,353,064 A | * | 10/1994 | Schlink | 348/468 |
| 5,355,170 A | * | 10/1994 | Eitz et al. | 348/467 |
| 5,635,987 A | * | 6/1997 | Park et al. | 348/468 |
| 5,644,362 A | * | 7/1997 | Cornelis | 348/468 |
| 5,691,776 A | * | 11/1997 | Van Gestel | 348/467 |
| 5,815,170 A | * | 9/1998 | Kimura et al. | 455/186.1 |
| 5,835,153 A | * | 11/1998 | Pratt et al. | 348/468 |
| 5,859,670 A | * | 1/1999 | Van Gestel | 348/473 |
| 5,905,537 A | * | 5/1999 | Van Gestel | 348/468 |
| 6,064,439 A | * | 5/2000 | Kimura et al. | 348/468 |
| 6,239,844 B1 | * | 5/2001 | Raiyat | 348/468 |
| 6,424,378 B1 | * | 7/2002 | Crespo et al. | 348/465 |
| 6,493,037 B1 | * | 12/2002 | Raiyat | 348/564 |
| 6,545,720 B1 | * | 4/2003 | Tauzia et al. | 348/468 |
| 6,637,032 B1 | * | 10/2003 | Feinleib | 725/110 |

FOREIGN PATENT DOCUMENTS

| | | |
|---|---|---|
| EP | 0637171 | 2/1995 |
| JP | 04170183 | * 6/1992 |
| WO | 00/19721 | 4/2000 |

OTHER PUBLICATIONS

ETS 300 707 (European Telecommunication Standard) Electronic Program Guide (EPG); Protocol for a TV Guide using electronic data transmission (May 1997) pp 1–89.*

ETS 300 706 (European Telecommunication Standard) Enhanced Teletext Specification (May 1997) pp 1–162.*

* cited by examiner

Primary Examiner—Brian P. Yenke
(74) Attorney, Agent, or Firm—Lisa K. Jorgenson; Allen, Dyer, Doppelt, Milbrath & Gilchrist, P.A.

(57) ABSTRACT

A teletext program includes several teletext pages, with each teletext page being broadcast in the form of a set of data packets. A method for displaying a teletext program index on a television receiver screen includes receiving a teletext page which includes the set of data packets. The set of data packets includes first and second data packets. The first data packet includes at least one label referring to another teletext page, and the second data packet is associated with the first data packet and includes a page number associated with at least one label. The method includes decoding the first and second data packets to obtain at least one label and the associated page number, and at least one label and the associated page number are stored in a buffer memory.

27 Claims, 1 Drawing Sheet

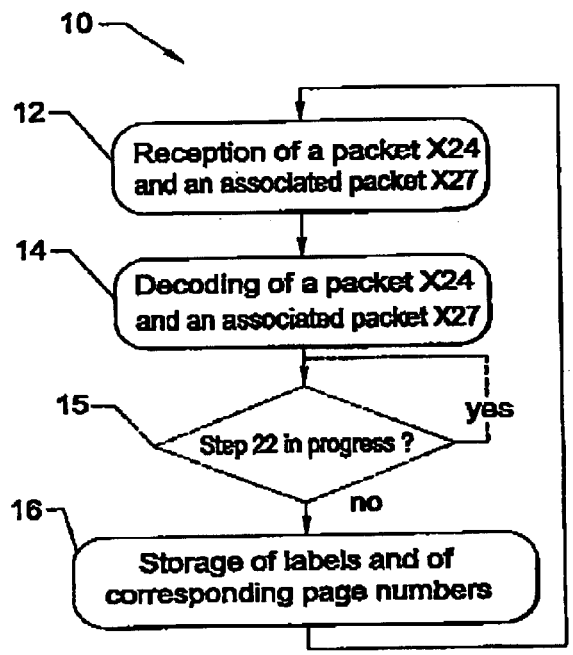
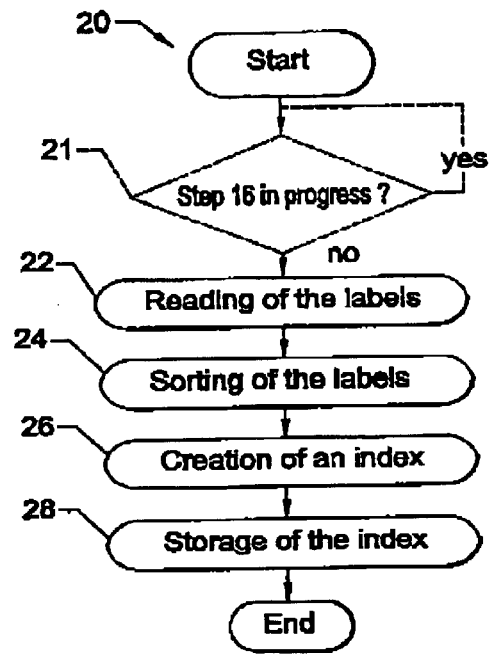
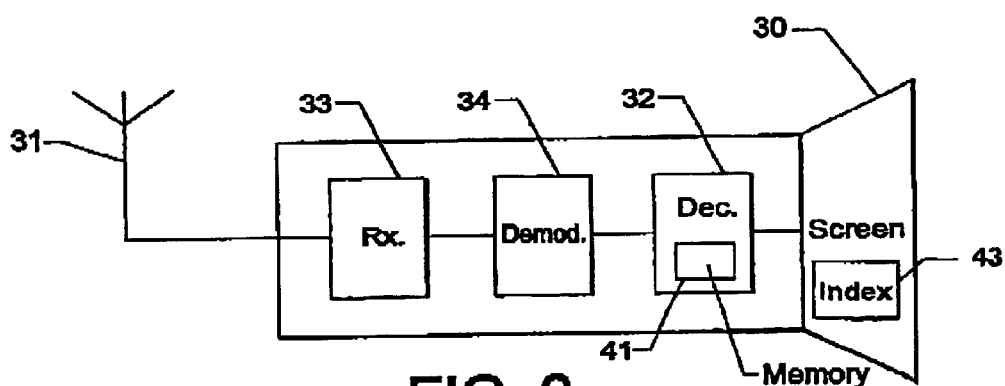

METHOD AND DEVICE TO DISPLAY AN INDEX OF TELETEXT PAGES

FIELD OF THE INVENTION

The present invention relates to the field of teletext, and more particularly, to displaying an index of teletext pages. Teletext is defined, for example, in the European Telecommunications Standard (ETS) 300,706, dated May, 1997, which is incorporated herein by reference.

BACKGROUND OF THE INVENTION

Teletext is an ancillary service of television channels designed to send written information in addition to video information. This written information is encoded in the form of digital data packets, commonly called teletext packets, that are broadcast at regular time intervals corresponding to the frame return between two images. One to eighteen teletext packets are thus broadcast about every 20 ms.

A television screen displays a teletext page of 25 lines, each with 40 characters. However, a teletext page is defined in practice by more than 32 teletext packets numbered X0 to X31, the contents of which are defined by the ETS standard. For each page, the following packets are transmitted. A packet X0 called a header packet that contains information especially on the number of the page to which it pertains is transmitted. At most 25 packets X1 to X25 called normal packets contain the characters to be displayed on the television screen with each packet corresponding to a line to be displayed are transmitted. In addition, packets known as non-displayable packets, X26, X27, X28, X29, X30 or X31, contain inter alias information for the shaping of the characters to be displayed and information on links towards other teletext pages are transmitted.

A full teletext program of a television channel comprises, for example, 500 pages that are associated, as the case may be, to form logic sets known as magazines. Each magazine comprises a variable number of teletext pages. For example, the television station may propose four magazines whose themes are, respectively, sports, finance, international news and weather. The total time to broadcast a teletext program is about 40 seconds and all the teletext pages are broadcast in cycles. In other words, one page is broadcast approximately every 40 seconds. This enables the television station to very regularly update the information content of its pages or to create animation effects.

To display a desired page, a teletext decoder of a television receiver first seeks the desired page by decoding the page number associated with each packet X0 received. Then the decoder copies all the packets of the desired page in a display memory. This display memory is read permanently by display means of the screen of the television set to display its contents on the screen.

Most usually, when the teletext service of a television channel is transmitted, the decoder automatically searches for page 100 and, as soon as it is received, displays it automatically. This page is, for example, an introduction page of the program. The page 100 shows the different magazines as well as the numbers of the first page of each magazine. To access a particular magazine, the user then keys the page number associated with the first page of the magazine desired into a remote control device or a keypad.

The user can also access a special page of a magazine by keying in the corresponding number of the desired page. This is of course possible only if the user knows the number of the desired page. The contents of a page having a given number is likely to change between two broadcasts of the same program. Furthermore, one page number may correspond to different magazines from one television channel to another. It is therefore not always easy for the user to retrieve the number of a page dealing with a desired subject.

There are existing navigation systems used to access a page dealing with a desired subject, without it being necessary to have any knowledge of the corresponding page number. A first navigation system is the FLOF system commonly used in France, England and Spain. The FLOF system is based on a color choice system. At the bottom of each page, the 24th line displayed on the screen has several labels, each corresponding to a link towards another page of the program. The 24th line displayed corresponds to the broadcast packet X24.

A label is a string of characters comprising eventually one or more words by which the user can identify the contents of the corresponding page. A label may also contain the number of the corresponding page, encoded in decimal form so that it can be understood by the user. The FLOF system associates a color code with each label. This color code corresponds, for example, to the background color on which the label is displayed.

To request the display of one of the pages whose label is displayed at the bottom of the page being displayed, the user simply chooses the color code associated with the chosen label. This choice is made, for example, by the remote control or the control keypad associated with the television set which, in this case, has colored buttons.

Then, in the control packet X27 of the page being displayed, the decoder will read the page number associated with the chosen label. The packet X27 indeed contains the page numbers associated with each label of the corresponding packet X24 of the page being displayed. These page numbers are encoded in the form of binary numbers. The desired page is finally loaded, namely searched for and copied into the display memory by the decoder and then displayed on the screen.

The FLOF navigation system is practical because it requires no knowledge of page numbers to display and consult a desired page. However, the number of links or labels displayed on one page is limited to six and, most usually, only four are used. It is therefore sometimes necessary to display several unwanted pages before displaying a desired page.

For example, if a user wishes to consult a page about the Paris stock exchange, he may have to first display the first page of the finance magazine, and then the first page of a section on the different international stock exchanges before he can finally display the desired page that concerns the Paris stock exchange. In certain cases, it may be necessary to display up to ten pages before obtaining the desired page. This means that a relatively lengthy time is needed to access certain pages.

A navigation system such as the FLOF system is also a closed system because the contents of the packets X24 and X27 associated with each teletext page of the program correspond to choices made by the supplier of the service. The user cannot choose his own links according to his own requirements.

A second navigation system is the table of pages (TOP) system, which is commonly used in German-speaking countries. With each set of pages or each program, a supplement is transmitted that includes non-displayable packets pertaining to the hierarchical ordering of the pages. These packets contain a definition of the links associated with each page. These packets are stored at each reception of a program.

With a system of this kind, this hierarchical ordering is done at three levels. Each magazine is divided into a set of a variable number of sections, with each section being divided into a variable number of pages. When a desired page is being displayed, the decoder displays, for example, at the bottom of the page on the 24th line, the labels "previous page", "next page", "next section", and "next magazine". When the user has made his choice of a colored button associated with the different labels or else by the controlled buttons for moving and selecting a label, the decoder associates the choice made with a corresponding page number contained in the hierarchical ordering packets.

Finally, the decoder searches for the desired page and stores it, as soon as it is received, in the display memory. With a navigation system like the TOP system, the user can thus go more easily from one page to the next one or from one section to the next one. However, if the user is interested only in a first section and a third section, he still has to request the display of the second section before accessing the third one.

Thus, present-day navigation systems for teletext services are easy to use because it is not necessary to know the number of a desired page to gain access to it. However, their use most commonly requires fairly lengthy periods of time to access the desired information. It is often necessary to load and display several pages before obtaining a desired page.

To limit the time taken to load a teletext page, it is possible to use a decoder with a buffer memory whose size is sufficient to store several teletext pages, even all the pages of a program broadcast by a television channel. This is especially the case with high-end television sets. In this case, when the teletext service is transmitted, the decoder first stores all or part of the program and then displays the introduction page. When a desired page has to be displayed, it is simply copied from the buffer memory into the display memory. This is a fast process.

In parallel, the contents of the buffer memory are refreshed continuously as the teletext pages are received. The display of a desired page is immediate because it is no longer necessary to wait for the reception of this desired page to be able to display it. However, if the television set is used with a TOP navigation system or a FLOF system, the user will nevertheless have to possibly display several pages on the screen before reaching the desired page. This is annoying to the user and unnecessary.

SUMMARY OF THE INVENTION

In view of the foregoing background, it is therefore an object of the present invention to implement a method and an associated device wherein the user can obtain easy and fast access to a desired teletext page by eliminating the need to display intermediate unwanted pages.

Another object of the invention is to implement a method and an associated device that can be used to give the user a fast, complete view of the entire teletext program of a television channel.

These and other objects, advantages and feature are provided by a method for displaying the index of a teletext program on a television receiver screen, wherein the teletext program comprises several teletext pages. Each teletext page may be broadcast in the form of a set of data packets.

More particularly, the method comprises the step of receiving a teletext page wherein the set of data packets includes a first data packet comprising at least one label referring to another teletext page, and a second data packet associated with the first data packet and comprising a page number associated with at least one label. The first and second data packets are decoded to obtain at least one label and its associated page number, and the at least one label and its associated page number are stored in a buffer memory.

The first data packet of the teletext page received can also comprise several labels, with each label referring to another teletext page. In this case the second packet of the teletext page received comprises a page number associated with each label of the first packet. The several labels and associated page numbers are stored during the storage step.

Preferably, the steps of reception, decoding and storage are performed in cycles at each reception of a teletext page of the program to update the contents of the buffer memory. According to one embodiment, the method may also comprise the step of displaying an index of the teletext program from the contents of the buffer memory. This may be performed at the user's request. The step for displaying the index preferably comprises the steps of reading in a buffer memory the labels and associated page numbers, and creating the index comprising one or more pages each including a list of labels and associated page numbers.

The invention uses information extracted from the first and second data packets already used to create one or more index pages listing the entire teletext program. With the invention, the user at any time can easily search for a desired teletext page and immediately obtain its number. He can also make a quick selection in the index by using shifting and selection buttons on a control keypad, for example, of the label of a desired teletext page to request its display. With the invention, the display of the desired page is fast because it is no longer necessary to request the display of intermediate teletext pages to access the desired teletext page.

The invention is easier to implement inasmuch as the first and second data packets are already broadcast routinely for each teletext page. The invention thus uses an already present information element to provide a more user-friendly navigation system that is simpler to use than the known navigation systems.

More particularly, a television signal receiver device comprises a reception antenna to receive pages of a teletext service. The antenna is coupled to a demodulator by a television signal receiver. A teletext decoder is coupled to the demodulator and includes a display memory therein. A screen is used to read and display the contents of the display memory.

According to the invention, the teletext decoder also comprises means to implement a method for the display of a previously described index, with the means comprising at least one buffer memory. According to one embodiment, the means of implementing the method comprises a set of logic gates. According to another embodiment, the means of implementing the method comprises software that includes a set of instructions stored in a memory of the decoder.

BRIEF DESCRIPTION OF THE DRAWINGS

The invention will be understood more clearly and other characteristics and advantages shall appear from the following description of an exemplary method of displaying an index of a teletext program according to the invention, the description of which refers to the appended figures, of which:

FIGS. 1a–1b illustrates flow charts for the implementation of displaying a teletext program index according to the present invention; and FIG. 2 is a block diagram of a device for implementing the display method according to the present invention.

DETAILED DESCRIPTION OF THE PREFERRED EMBODIMENTS

Referring now to FIGS. 1a–1b and 2, the method of the invention is used to build a full index of a received teletext program when a user of the teletext service asks for it. The pieces of information needed to display the index are regularly updated in parallel throughout the period of use of the teletext service. It is furthermore assumed in the illustrated example that a television channel proposing the teletext program broadcasts a number N=20 of teletext pages and that the full index comprises a single page, i.e., it can be displayed in one take on the screen. The full program (the N pages) is broadcast by the channel continuously and in cycles throughout the period of use of the service.

In the example, the method for displaying an index 43 in accordance with the invention is implemented in a television signal receiver comprising a screen 30, an antenna 31 coupled to a decoder 32 via a receiver 33 and a television signal demodulator 34. The decoder 32 comprises a display memory 41 that is permanently read by the screen 30. The decoder 32 also implements the method of the invention which will be described in greater detail below.

In the example, the method of displaying according to the invention comprises, according to FIG. 1a, a first step 10 for the acquisition of the data needed to make an index, and a second step 20 to display the index. The first step 10 is performed continuously for each teletext page broadcast and throughout the period of operation of the teletext service. On the contrary, the second step 20 for the display of the index is executed at the request by the user of the service.

The first step 10 has substeps including reception (step 12), decoding (step 14) and storage (step 16) of the information needed to make the index. During the step 12, a decoder of a television receiver receives the data packets of a teletext page, especially the packets X24 and X27.

As explained above, the packet X24 of a teletext page contains a set of labels, usually less than four and possibly zero. The labels represent the links to other pages of the teletext program. The associated packet X27 for its part contains the page numbers associated with each label of the corresponding packet X24 encoded in the form of binary numbers. A label is a string of characters comprising one or more words by which the user can identify the contents of the corresponding page. Advantageously, a label also comprises a word indicating the number of the corresponding page in decimal form. For example, a label such as "SPORT: 150" informs the user that the sports magazine begins at page 150 of the program.

During the step 14, the decoder decodes the packets X24 and X27 to associate, with each label of the packet X24, the corresponding page number contained in the packet X27. In the step 16, the label/page-number pairs obtained at the end of the step 14, if there are any, are stored in a buffer memory. Naturally, if a previous value of a label/page-number pair is already stored in the buffer memory, then this previous value is erased and replaced by the new value.

The label/page-number pairs are, for example, stored in alphabetical order of the labels. This straightforward approach prevents redundancy and the unnecessary storage of the same label/page-number pair at two different points of the buffer memory. This is a non-negligible risk because the same label may be contained in several packets X24. Other approaches may naturally be planned. For example, the label/page-number pairs may be classified by an increasing order of page numbers. This classification is, however, less valuable because two different labels may refer to the same page and it possible that information might be lost.

At the end of step 16, a new step 10 is performed. The step 10 is thus performed continuously throughout the period of use of the teletext service. The contents of the buffer memory can thus be updated. The second step 20 for displaying the index is performed in parallel with the first step 10 and at the user's request. In the example of FIG. 1b, the step 20 has four substeps, which are for the reading (step 22) and sorting (step 24) of the labels, creation (step 26) and storage (step 28) of the index.

During the step 22, the labels are read in the buffer memory. During the step 24, the labels and associated numbers are sorted and classified, for example, in an alphabetical order of the labels. They may also be classified by theme, by the grouping of labels that comprise a common part which includes a string of characters. Other types of sorting may be used. What is essential is that all the labels should be listed, preferably in the manner most easily comprehensible to the user. The sorting step 24 is not indispensable and may be eliminated as the case may be. This step simply seeks to facilitate the future use of the index.

The step of creating the index 26 includes the creation of a menu which, just like a page of the teletext program, may comprise a packet X0, at most 23 packets X1 to X23 and possibly packets X24 to X31. A menu is a set of written information elements generated by the teletext decoder and not broadcast by a television channel. A menu may also be stored in a memory of the decoder and/or be displayed on the screen. A menu may contain several pages if its contents are too great to be displayed in a single time on the screen. Menus other than the index menu exist and are known. For example, a menu containing advice on adjusting the sound and image of the receiver may be displayed on the screen when the teletext decoder is powered on.

The packets X0 to X31 of the index menu are defined as follows. The packet X0 is a header packet comprising information on the contents of the following packets X1 to X31. For example, this information is in the form of a string of index characters and a page number different from the numbers of the teletext pages of the program.

The packets X1 to X23 of the index menu, called normal packets, contain the labels previously stored in the buffer memory that form the information content of the index. Each normal packet comprises the set of characters to be displayed on the same line of the screen. Thus, depending on the size of the labels, i.e., the number of characters that form them, the same packet may comprise one or more labels or simply a part of the labels. For a program comprising N=20 teletext pages, it is possible to create 20 packets X2 to X21 each comprising a label, for example.

The packets X24, X25, X26, X27, X28, X29, X30 or X31 contain information on the shaping of the contents of the normal packets of the index menu when they are displayed and possible information on links to other teletext pages of the program. These packets are not indispensable to making the index and it may be that they will not be created. During the performance of the step 28, the set of packets X0 to X31 of the index menu created is then stored in the display memory which is read permanently by the display means of the screen of the television set to display its contents on the screen.

In the above example of a teletext program comprising N=20 pages, the set of labels of the program is stored in only 20 packets of data to be displayed, X2 to X21, and the method gives an index menu containing only one page. Furthermore, each label displayed in the index comprises the number (in decimal base) of the corresponding page. In this case, to use the displayed index and request the display of a desired teletext page of the program, the user simply identifies the page number contained in the label of the chosen teletext page.

One variation of the method of FIG. 1a–1b is especially valuable for programs comprising a large number of teletext pages, such as N=100 pages for example, and for which it is necessary to create an index menu containing several pages to list all the labels of all the teletext pages of the program. For this variation, the steps 26 and 28 are modified as follows.

During the performance of the step 26, an index of several pages is created. As many index pages are created as are needed to list all the labels contained in the buffer memory and stored in the course of successive performances of the step 16. For example, for a program of 100 teletext pages, it is possible to create five index pages, each page containing 20 labels indicating the subject processed in 20 different teletext pages. Each index page created essentially comprises a teletext page at the broadcast program, a packet X0, at most 23 packets X1 to X23, and possibly the packets X24 to X31 defined as follows.

The header packet X0 comprises an indication of the contents of the page and a page number. Naturally, two different index pages may comprise different page numbers. The packets X1 to X23 comprise labels contained in the buffer memory and classified, as the case may be, by alphabetical order or by theme. The packet X24 comprises labels of the "next page" and/or "previous page" type. The labels may also contain the number in a form readable by the user of the corresponding index pages to enable the user to have easy access to all the pages of the index menu.

The packet X27, if it exists, contains page numbers of the index menu associated with the labels of the packet X24 and is encoded in the form of binary numbers. Finally, the packets X25, X26, X28, X29, X30 or X31, if they exist, contain information on the shaping of the contents of the packets X1 to X23 during their display on the screen.

During the performance of the step 28, all the pages created during the performance of the previous step 26 are then stored in a second buffer memory. Then a page, preferably the first page of the index menu is copied from the second buffer memory to the display memory to immediately display the beginning of the index.

It must be noted that the first and second buffer memories used to store the label/page-number pairs during the step 16, and the full index during the step 28 may be replaced by a single buffer memory comprising a first zone to store the contents of the packets X24 and X27 of the pages of the program and a second zone to store the created index.

It must also be noted that it is not indispensable to create packets X27 associated with the packets X24 for the index pages if the page numbers are already registered in the labels contained in the packets X24, and therefore displayed on the screen. Indeed, in this case the user may request the display of a desired index page by directly keying the number of the desired index page into the control keypad or remote control unit of the receiver. However, the addition of packets X27 makes it easier to use the index and enables the consultation of all the pages of the index, and possibly the choice of a page, by using shift and selection keys or colored buttons, for example.

It must be noted finally that the method and device described above with reference to FIGS. 1a–1b and 2 are only non-restrictive examples of implementation of the invention. In particular, all the numerical values are given simply by way of an indication and, obviously, they may be modified.

In another variation of the method of the invention, the steps 10 and 20 comprise testing sub-steps 15 and 21, which are shown as dashed lines in FIGS. 1a–1b. During the performance of the step 15, it is determined that a step 22 for the reading of the buffer memory is in progress. If the test is negative, the buffer memory is freely accessible and the storage step 16 is performed. On the contrary, if a step 22 is in progress, then a new testing step 15 is performed.

In the same way, during the performance of the step 21, a verification is made to find out if a label-storage step 16 is in progress or not. If the test is negative, the buffer memory is freely accessible and the reading step 22 is performed. On the contrary, if a step 16 is in progress, then a new test step 21 is performed. This variation is particularly valuable in the fairly frequent case where the buffer memory cannot be used both in reading and in writing. The addition of the test steps 15 and 21 then prevents any conflicts of access.

The method of the invention, an example of which has been described above, is implemented by the decoder of a television signal receiver of the kind shown in FIG. 2 by means provided for this purpose, namely means to create and display one or more index pages on the screen from a set of teletext pages transmitted to the receiver in the form of digital data packets.

This means comprises a first buffer memory to store the labels and page numbers during the performance of the step 16 and, if necessary, a second buffer memory to store pages of the index during the performance of the storage step 28. Naturally, the first and second memories may be replaced by two distinct zones of the same memory. According to a preferred embodiment, the means furthermore comprises software means that includes a set of instructions stored in a memory of the decoder designed for this purpose. According to another embodiment, the means comprises a set of logic gates and circuits.

That which is claimed is:

1. A method for displaying an index of a teletext program on a television screen, the teletext program comprising a plurality of teletext pages with each teletext page being broadcast as a set of data packets, the method comprising:
   receiving a teletext page with the set of data packets including a first data packet comprising a plurality of labels, each label referring to another teletext page, and including a second data packet comprising a respective page number associated with each label of the first data packet;
   decoding the first and second data packets to obtain each label and the associated page number;
   storing the plurality of labels and the associated page numbers in a memory to be used for the displaying of the index; and
   displaying the index at a user's request based upon contents of the memory, the displaying comprising
      reading the plurality of labels and associated page numbers from the memory, and
      creating the index comprising at least one page comprising a list of labels and associated page numbers.

2. A method according to claim 1, wherein the receiving, decoding and storing are performed in cycles at each reception of a teletext page.

3. A method according to claim 1, wherein displaying the index comprises sorting the plurality labels and associated page numbers.

4. A method according to claim 3, wherein the plurality of labels are sorted by alphabetical order.

5. A method according to claim 3, wherein the plurality of labels are sorted by theme.

6. A method according to claim 1, wherein the displaying comprises:
   storing the index in a first display memory if the index comprises a single page; and
   storing a first page of the index in the first display memory and storing other pages of the index in a second display memory if the index comprises a plurality of pages.

7. A method according to claim 1, further comprising determining if the reading is being executed before the storing, and then performing the storing if the reading is not being executed.

8. A method according to claim 1, further comprising determining if the storing is being executed before the reading, and then performing the reading if the storing is not being executed.

9. A method according to claim 1, wherein the teletext program is in accordance with the European Telecommunications Standard (ETS).

10. A method for displaying an index of a teletext program on a television screen comprising:
    receiving the teletext program comprising at least one teletext page comprising a set of data packets including a first data packet comprising a plurality of labels, each label referring to another teletext page, and including a second data packet comprising a respective page number associated with each label of the first data packet;
    decoding the first and second data packets to obtain each label and the associated page number;
    storing the plurality of labels and the associated page numbers in a memory; and
    displaying the index at a user's request based upon contents of the memory, the displaying comprising
        reading the plurality of labels and associated page numbers from the memory, and
        creating the index comprising at least one page comprising a list of labels and associated page numbers.

11. A method according to claim 10, wherein the receiving, decoding and storing are performed in cycles at each reception of a teletext page.

12. A method according to claim 10, wherein displaying the index comprises sorting the plurality labels and associated page numbers.

13. A method according to claim 12, wherein the plurality of labels are sorted by alphabetical order.

14. A method according to claim 12, wherein the plurality of labels are sorted by theme.

15. A method according to claim 10, wherein the displaying comprises:
    storing the index in a first display memory if the index comprises a single page; and
    storing a first page of the index in the first display memory and storing other pages of the index in a second display memory if the index comprises a plurality of pages.

16. A method according to claim 10, further comprising determining if the reading is being executed before the storing, and then performing the storing if the reading is not being executed.

17. A method according to claim 10, further comprising determining if the storing is being executed before the reading, and then performing the reading if the storing is not being executed.

18. A method according to claim 10, wherein the teletext program is in accordance with the European Telecommunications Standard (ETS).

19. A television comprising:
    a receiver for receiving a teletext program comprising at least one teletext page comprising a set of data packets, the at least one teletext page including a first data packet comprising a plurality of labels, each label referring to another teletext page, and including a second data packet comprising a respective page number associated with each label of the first data packet;
    a demodulator connected to said receiver;
    a decoder connected to said demodulator and comprising a memory, said decoder decoding the first and second data packets to obtain the at least one label and the associated page number, and storing the plurality of labels and the associated page numbers in said memory; and
    a screen connected to said decoder for displaying an index of the at least one teletext page based upon contents of said memory, said screen displaying the index by reading the labels and associated page numbers from said memory, and creating the index including at least one page each comprising a list of labels arid associated page numbers.

20. A television according to claim 19, wherein said decoder comprises a plurality of logic gates for decoding the first and second data packets.

21. A television according to claim 21, wherein said decoder comprises a set of software instructions for decoding the first and second data packets.

22. A television according to claim 19, wherein said screen displays the index at a user's request.

23. A television according to claim 22, wherein said screen comprises a first and a second display memory; and wherein said screen stores the index in said first display memory if the index comprises a single page, and stores a first page of the index in said first display memory and stores other pages of the index in said second display memory if the index comprises a plurality of pages.

24. A television according to claim 19, wherein said screen sorts the labels and associated page numbers.

25. A television according to claim 24, wherein the labels are sorted by alphabetical order.

26. A television according to claim 24, wherein the labels are sorted by theme.

27. A television according to claim 19, wherein the teletext program is in accordance with the European Telecommunications Standard (ETS).

* * * * *